(12) United States Patent
Bruchlos et al.

(10) Patent No.: US 6,494,372 B2
(45) Date of Patent: Dec. 17, 2002

(54) SELF SERVICE TERMINAL AND METHOD FOR PROCESSING TRANSACTION FORMS

(75) Inventors: Joachim Bruchlos, Calw (DE); Ludwig Fischer, Herrenberg (DE); Peter Kuczewski, Gaertringen (DE); Guenther Reus, Herrenberg (DE); Klaus Schroth, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 09/780,647

(22) Filed: Feb. 9, 2001

(65) Prior Publication Data

US 2001/0025880 A1 Oct. 4, 2001

(30) Foreign Application Priority Data

Apr. 4, 2000 (EP) .............................. 00107339

(51) Int. Cl.[7] ................................. G06K 7/14
(52) U.S. Cl. ...................... 235/454; 235/379
(58) Field of Search ................. 235/379, 454

(56) References Cited

U.S. PATENT DOCUMENTS

| | | | |
|---|---|---|---|
| 4,264,808 A | | 4/1981 | Owens |
| 4,617,457 A | * | 10/1986 | Granzow et al. ........... 235/379 |
| 4,716,291 A | * | 12/1987 | Sakamoto et al. .......... 235/379 |
| 4,758,713 A | | 7/1988 | Matsukawa |
| 5,097,517 A | | 3/1992 | Holt |
| 5,732,148 A | * | 3/1998 | Keagy et al. ................ 235/379 |
| 5,796,876 A | * | 8/1998 | Wang et al. ................. 235/379 |
| 5,832,463 A | | 11/1998 | Funk |
| 6,192,146 B1 | * | 2/2001 | Abe ........................... 235/379 |
| 6,325,288 B1 | * | 12/2001 | Spitz ..................... 235/462.12 |

FOREIGN PATENT DOCUMENTS

JP          59146373          10/1983

* cited by examiner

Primary Examiner—Harold I. Pitts
(74) Attorney, Agent, or Firm—Bracewell & Patterson; J. Bruce Schelkopf

(57) ABSTRACT

A self service terminal for processing transaction forms or slips, especially checks and transfer forms, is provided, including means for optically reading and taking an electronic image of said transaction form or slip with a transparent plate. The transaction form or slip is positionable on said transparent plate in such a way that there is no motion of the form when taking the electronic image.

21 Claims, 4 Drawing Sheets

SELF SERVICE TERMINAL AND METHOD FOR PROCESSING TRANSACTION FORMS

FIELD OF THE INVENTION

The present invention refers to the field of self service terminals. More specifically, the invention pertains to such a terminal for processing transaction forms or slips in the banking area. The invention also refers to a method for processing such transaction forms or slips.

BACKGROUND OF THE INVENTION

The typical processing procedure for transaction forms like checks, deposit/withdrawal slips, transfer and other forms used in the field of banking, today is long, laborious and tedious, requiring one or more days of processing time and many manual processing steps. In addition, since a great number of such forms circulate, and the banks, according to legal provisions, will have to keep these forms for a certain period of time, methods have been developed to take an electronic image of the respective forms. These images (data records) can be stored in a memory instead of "piling up" the original forms, this being cheaper and space-saving. There is also no need to key-in the contents of such a form manually, since the electronic image can be recorded automatically using recognition hard- or software (RECO). Examples for such systems can be found in U.S. Pat. Nos. 4,264,808, 5,097,517 and 5,832,463. JP-A-59146373 discloses a slip processor to process speedily and accurately slips by storing necessary data read out of the slips, and providing a means for recognizing the storage data and a means for editing the recognized data by classification.

In U.S. Pat. No. 4,758,713, a banking terminal equipment is disclosed for processing transaction slips used in a bank. The equipment comprises an optical read device for which the fields of the data recorded in the transaction slip required to be sent to an upper station are located at a first read position of the slip such that the data of the fields is displayed on a display screen during a read operation on the transaction slip by the optical read device.

Optical reading devices for taking an electronic image of the respective form normally comprise scanners. The form, e.g., a check or the like, is retracted into the scanner and passed along to a "scan-line" (CCD-line) where the picture elements are recorded. The transport of the respective form along the scan-line, however, has to be performed using a very constant speed in order to be able to achieve a correct transformation of the original form into picture elements (Image).

The transport of the forms with this accurate speed through the scanner, however, is very susceptible to troubles, especially when using self service machines. This is based on the difference of quality of the forms or slips which cannot be controlled.

The following quality features can be observed in practice:

The form is extremely thin and shows only little stiffness,
The form is extremely thick and stiff,
Two forms are stacked one upon the other, in addition, they may be connected by a perforation,
Two forms are connected by a paper clip or the like,
There is a sticker on the front or back side of the form,
The forms are partially wrinkled or contain "dog's ears",
The forms are rendered or cracked,
The forms are solid,
The forms show frictional electricity due to the paper used.

These problems are less difficult to handle when not using self service machines since the respective forms will be sorted out by technical personel. However, when using self service machines, these differences in quality lead to many interruptions or breakdowns. In addition to that, damage and/or soiling of the transport rolls as well as the scan-line may occur. Removal is very time-consuming and expensive since it has to be done by skilled workers. In addition, the down-time is economically detrimental.

Taking remedial measures is only possible by using an extremely robust scanners or feeding mechanisms being rarely susceptible to troubles. However, a mechanism being able to transport every medium showing the above mentioned problems securely and with a constant speed through the scanner is either impossible or would be very costly.

It has to be mentioned that the present invention is not only applicable to forms processed in the banking area. It can also be used to process other forms or slips like admission tickets, vouchers, coupons, parcel forms, lottery tickets, voting papers and the like.

SUMMARY OF THE INVENTION

It is therefore an object of the invention to provide a self service terminal for processing transaction forms or slips that is less susceptible to troubles.

It is a further object of the present invention to provide such a terminal where damage and/or soiling of important parts is avoided.

It is still a further object of the invention to provide a method for processing transaction forms or slips in a self service terminal that avoids the above described problems.

These and other objects and advantages are achieved by the self service terminal disclosed herein and the method disclosed herein.

Advantageous embodiments of the invention are described in the dependent claims.

BRIEF DESCRIPTION OF THE DRAWINGS

The invention will hereinafter be described in more detail in connection with the accompanying drawings, in which.

DETAILED DESCRIPTION OF THE INVENTION

As has already been described above, optical reading devices for taking an electronic image of the respective form normally comprise scanners. The form, e.g., a check or the like, is retracted into the scanner and passed along to a "scan-line" (CCD-line) where the picture elements are recorded. The transport of the respective form along the scan-line, however, has to be performed using a very constant speed in order to be able to achieve a correct transformation of the original form into picture elements (Image). This results in the above mentioned problems.

The present invention therefore proposes a self service terminal for processing transaction forms or slips, including means for optically reading and taking an electronic image of said transaction form or slip, said means comprising a transparent plate, wherein the transaction form or slip is positionable on said transparent plate in such a way that there is no motion of the transaction form or slip when taking the electronic image.

The transaction form or slip is positioned on the transparent plate and aligned. This can be done either manually or by a feeder mechanism. A template is used to exactly position the form, this template having special dimensions including tolerances. The template forms a window on the transparent plate, so that the form can be exactly arranged thereon. The template is formed such that the greatest possible form can be accurately positioned. By providing special dimensions, it is possible to prevent the customer from introducing the form in the wrong direction, since normally these forms do have a length different from its width. It has to be noted that a feeder mechanism is only used to position the transaction form or slip on the transparent plate (and possibly to return the form), a uniform speed does not play any role in this case.

The transparent plate, which has to be plane and smooth and should also be scratch-resistant, may form the top side of the optically reading means, which, in this case, may comprise a conventional scanner. Since most of the forms or slips have ISO paper sizes, e.g., DIN A 6, a respective flat bed scanner can be used.

In another advantageous embodiment of the invention, the means for optically reading and taking an electronic image of the transaction form or slip can be a CCD camera(high-resolution color camera).

Many technical documents, e.g., bank transaction forms or checks, do require only a resolution of about 100 to about 400 dpi (a much high resolution would eventually even be troublesome in this case due to the very high amount of data). Thus, in a form of DIN A 6 format having a size of about 4.2×5.9 inches, the number of pixels amounts to about 1 million at a resolution of about 200 dpi. This value can easily be realized by a CCD camera.

The big advantage of using CCD cameras is the fact that, in contrast to conventionally used scanners, they do not have any movable parts and, accordingly, there is no wear.

Figure 1:
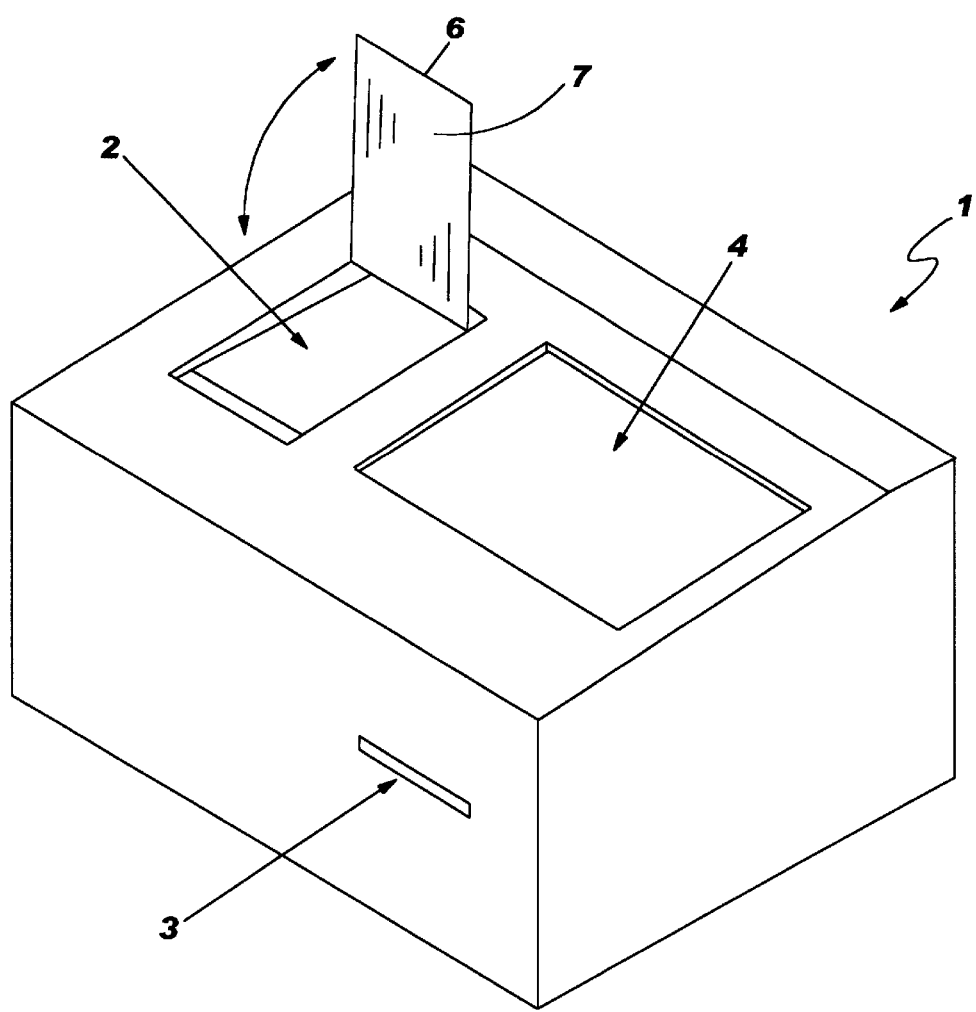
FIG. 1 is a schematic view of a self service terminal according to the invention.

In a preferred embodiment of the present invention, the image taking means is arranged within a protective housing, thus preventing soiling of the apparatus. This arrangement is shown in FIG. 1. In the housing 1, there is arranged a means for optically reading the transaction form or slip behind a transparent plate 2. In the case a CCD camera (cf. reference numeral 12 in FIG. 3) is used, the housing may be formed as a lighting box, thereby lighting the transaction form or slip homogeneously. The form to be read is positioned on the transparent plate 2 arranged at the top of the box. In addition, the box may contain a card reader 3 and/or a TFT screen 4. The card reader can function as an identification control so that only authorized customers can use the terminal after inserting a respective identification card. The TFT screen can be used as a control panel for displaying input commands, customer information or the like.

Figure 2A:
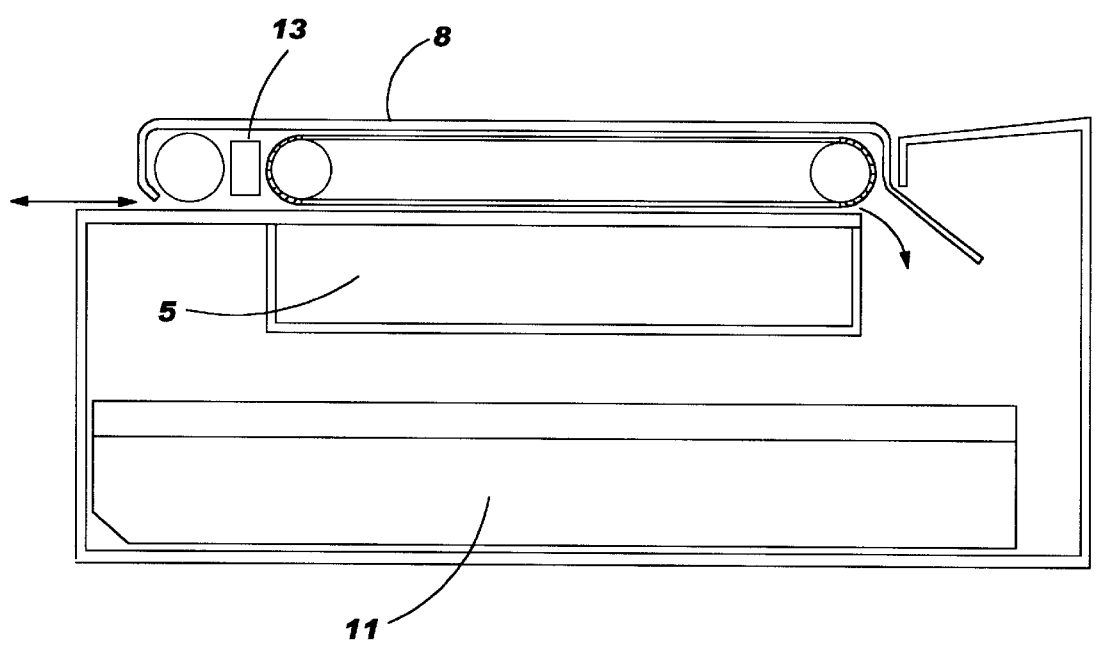
FIGS. 2A and 2B show another embodiment of a self service terminal according to the invention.

In case a scanner 5 is used for taking the image of the transaction form or slip, the transparent plate 2 may be formed by the glass plate arranged on the top side of the scanner 5 itself (cf. FIG. 2A).

By taking the electronic image when the transaction form or slip is not moving, the above mentioned problems dealing with different quality features of the respective forms, are avoided and the image becomes independent of the form to be read. The image that can be "seen" by the optically reading means through the transparent plate is taken and can then be further converted. It is still possible that the form to be read contains an address label, a paper clip, etc., and this will be seen in the image taken. However, since the form is not moved during taking the image, there will be no functional malfunction or even damage of the apparatus.

As already mentioned the image is taken through the transparent plate (this plate being made of glass or plastic with glass being preferred due to its surface hardness and greater fireproof quality) either being the top plate of the scanner or a separate plate arranged at the top side of the box. Referring again to FIG. 1, the plate 2 may be protected by a protective cover or "door" 6 to prevent damage of the plate or for security reasons. This door will only open in case a customer has inserted a valid identification card into card reader 3.

In case no transaction form or slip is present on the transparent plate 2, the optical reading means will, when the protective door is shut, take an image of the backside of this door 6.

In an especially preferred embodiment of the invention, the backside of the protecting door 6 is provided with a test pattern 7, facing the transparent plate. A test image can be generated by taking an image of this test pattern which can then be evaluated by a test circuit on demand. Thus, soiling of the transparent plate can easily be discovered automatically.

Besides recognizing soiling, it is also possible to detect and identify foreign matter present in the scan area.

By using a test circuit an automatic request for cleaning the plate or the apparatus can be issued. Should the plate be heavily soiled or has foreign matter been detected, it is even possible to shut off the whole apparatus. Thus, taking defective images is avoided. It is advantageous to take an electronic image of the test pattern through the cleaned transparent plate, storing this image in a memory and comparing it from time to time with an image taken after the apparatus has been in use for a certain period of time. It is thus possible to check each pixel of the image and detect even small impurities or the like.

Figure 2B:
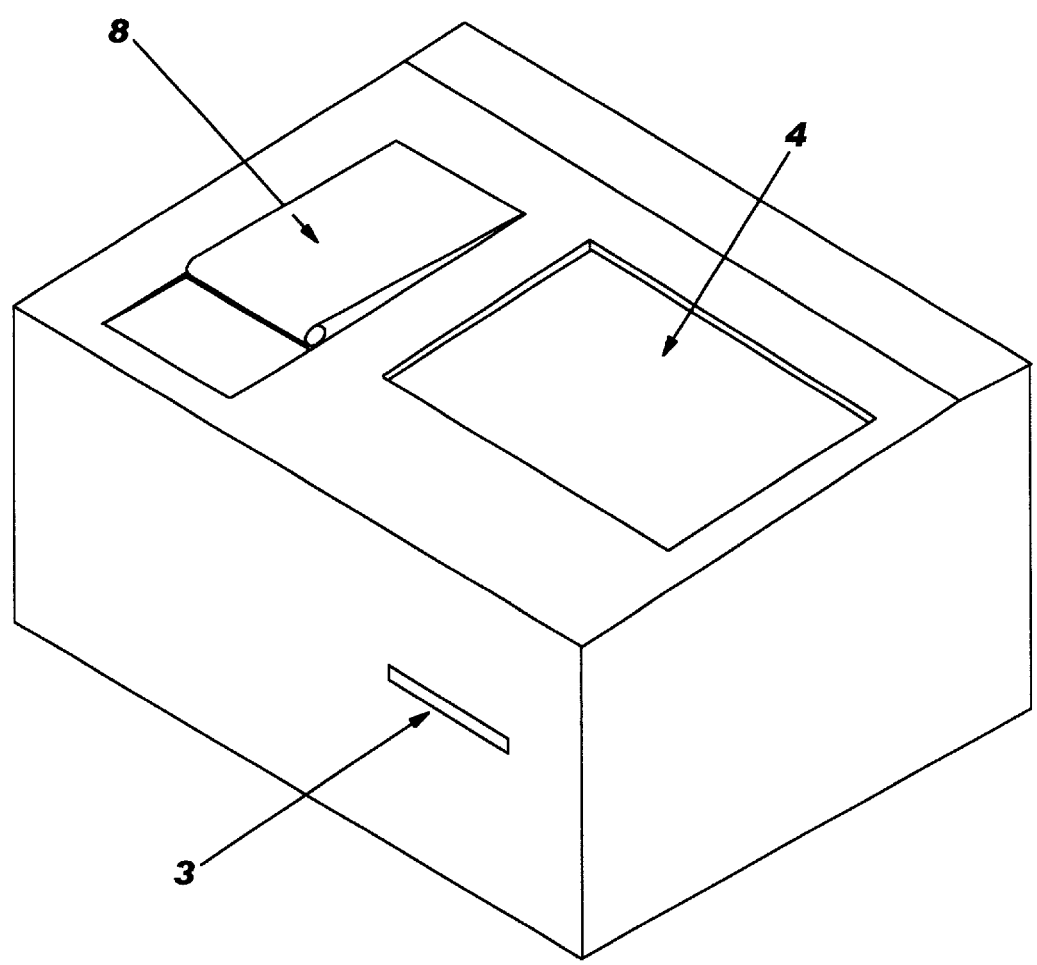

As can be seen in FIGS. 2A and 2B, a feeding mechanism 8 for feeding the transaction form or slip onto the transparent plate can be additionally provided. FIG. 2A shows such a feeder 8 that transports the form from the left side to its final position on the plate. After having taken the image, the form can either be given back to the left side or transported to the right side of the feeder means (not shown). Another possibility is retracting the form into the machine.

It has again to be mentioned that this feeding mechanism only serves for positioning the form to be read on the transparent plate. During taking of the image the form is not moved.

It is clear that many different "hand-me-down" feeders can be used to move the form into position. FIG. 2A shows a feeding mechanism that is horizontally arranged on top of the terminal. However, as depicted in FIG. 3, it is also possible to arrange the feeding mechanism vertically.

Figure 3:
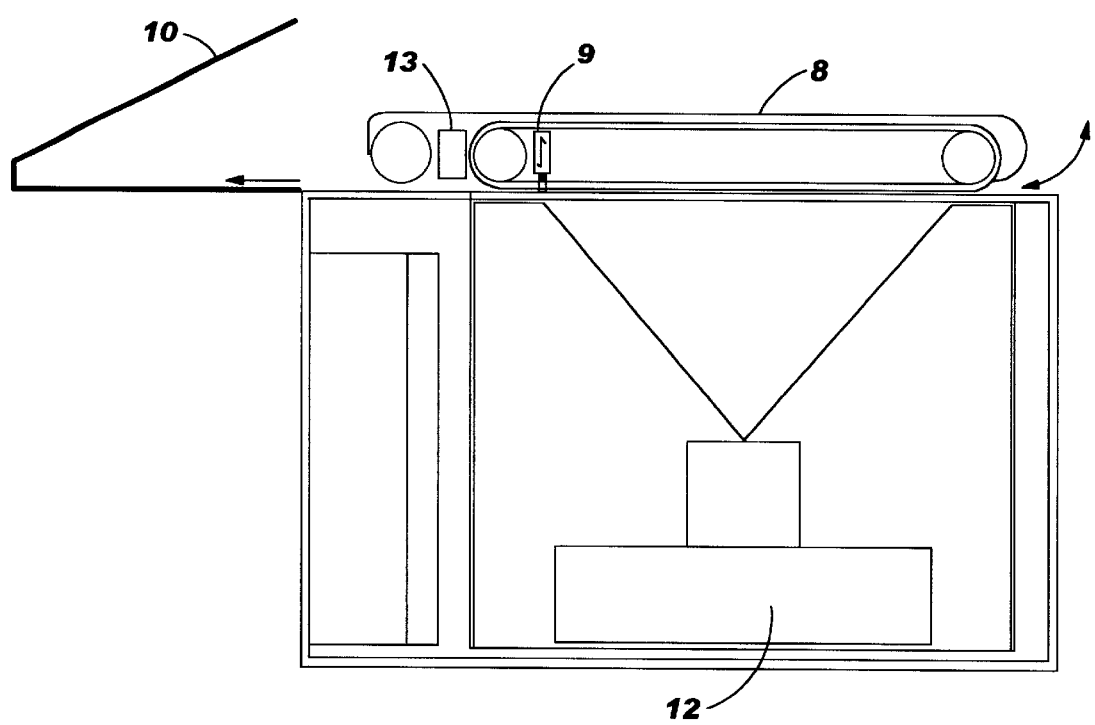
FIG. 3 depicts a third embodiment of the terminal according to the invention.

Looking at FIG. 3, the feeding mechanism can include a movable stop 9 within the path of the document to be read. When drawing in the form, it advances till the movable stop and is aligned thereby. In case the form is not to be retracted to the upper end of the feeding mechanism but is to be put into the pocket 10 below the terminal or should be advanced to the opposite side of where it has been inserted, the movable stop is withdrawn before the form advances.

It has to be noted that it is also possible to return said form or slip instead of advancing it to the pocket by reversing the moving direction of the feeder mechanism.

Additionally, the feeding mechanism can comprise means (13, FIG. 2A) for marking or stamping the form or slip. Thus, such information as, e.g., date of delivery, etc., can be printed on the form.

Furthermore, it is possible to include some electronics 11, like a PC or a notebook for controlling and data transfer.

The self service terminal according to the present invention can thus be used as an electronic mailbox. The information present on a form is converted into an electronic image which is stored in a memory. The form can then be given back to the user either with or without a stamp. The electronic image taken is either directly passed on for further prosecution or several images are collected and are then automatically read out of the memory after a predetermined time or number, i.e., the mailbox is cleared.

The invention permits a simple, secure and reliable conversion of a physical type face into an electronic image. The operation is simple and mostly independent of the quality of the hardcopy carrying the respective information.

While the invention has been particularly shown and described herein, it will be further understood by those skilled in the art that the foregoing and other changes in form, materials and arrangements and detail may be made without departing from the principle and scope of the invention as expressed in the following claims.

What is claimed is:

1. A self service terminal for processing a transaction form, said self service terminal comprising:
    means for optically reading and taking an electronic image of said transaction form positioned on a transparent plate;
    a protective cover for covering said transparent plate, said protective cover having a backside that is selectively positioned against said transparent plate during an optical reading operation by said terminal;
    a test pattern on said backside of said protective door; and
    means to compare a test image of said test pattern, said test image made by said means for optically reading and taking an electronic image of said transaction form, with a known image, wherein said means to compare is able to detect a foreign matter, on said transparent plate, that may be capable of causing to an erroneous electronic image to be made of said transaction form.

2. The terminal according to claim 1, wherein said transaction form is a banking form, a check or a transfer form.

3. The terminal according to claim 1, wherein said means for optically reading and taking an electronic image is a scanner.

4. The terminal according to claim 1, wherein said means for optically reading and taking an electronic image is a CCD camera.

5. The terminal according to claim 1, wherein said means for optically reading and taking an electronic image is arranged in a housing.

6. The terminal according to claim 1, further comprising means to prompt a user to remove said foreign matter from said transparent plate.

7. The terminal according to claim 1, further comprising means to shut off said self-service terminal.

8. The terminal according to claim 1, wherein said electronic image of said transaction form provides information to a character recognition software.

9. The terminal according to claim 5, wherein said housing further comprises a card reader, a TFT screen or electronics for controlling and data transfer.

10. The terminal according to claim 1, wherein said terminal further comprises feeding means for feeding said transaction form.

11. The terminal according to claim 10, wherein said feeding means is arranged horizontally.

12. The terminal according to claim 10, wherein said feeding means is arranged vertically.

13. The terminal according to claim 10, wherein a movable stop is arranged in said feeding means for aligning said transaction form or slip.

14. The terminal according to claim 1, wherein said terminal further comprises marking means for marking or stamping said form or slip.

15. A method for processing a transaction form in a self service terminal, said method comprising the steps of:
    positioning said transaction form on a transparent plate,
    taking an electronic image of said transaction form while said form is in a steady position;
    positioning a cover having a test pattern over said transparent plate;
    taking a test image of said test pattern;
    comparing said test image with a known image; and
    responding to a difference between said test image and said known image when said difference indicates a foreign matter on said transparent plate, said foreign matter being capable of causing an erroneous electronic image to be made of said transaction form.

16. The method according to claim 15, wherein a feeder mechanism positions said transaction form.

17. The method according to claim 15, further comprising the step of marking or stamping said transaction form.

18. The method according to claim 15, wherein said responding step includes prompting a user to remove said foreign matter from said transparent plate.

19. The method according to claim 15, wherein said responding step includes shutting said self service terminal off.

20. The method according to claim 15, wherein said electronic image of said transaction form provides information to a character recognition software.

21. The method of claim 15, wherein said terminal is an electronic mailbox.

* * * * *